H. PEDERSON.
END GATE.
APPLICATION FILED SEPT. 23, 1914.
1,150,961.
Patented Aug. 24, 1915.
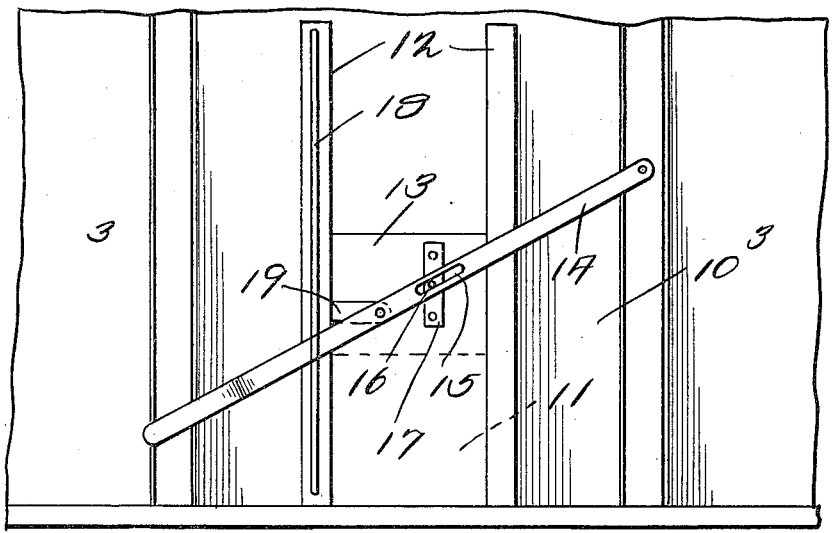
Fig.1.    Fig.2.
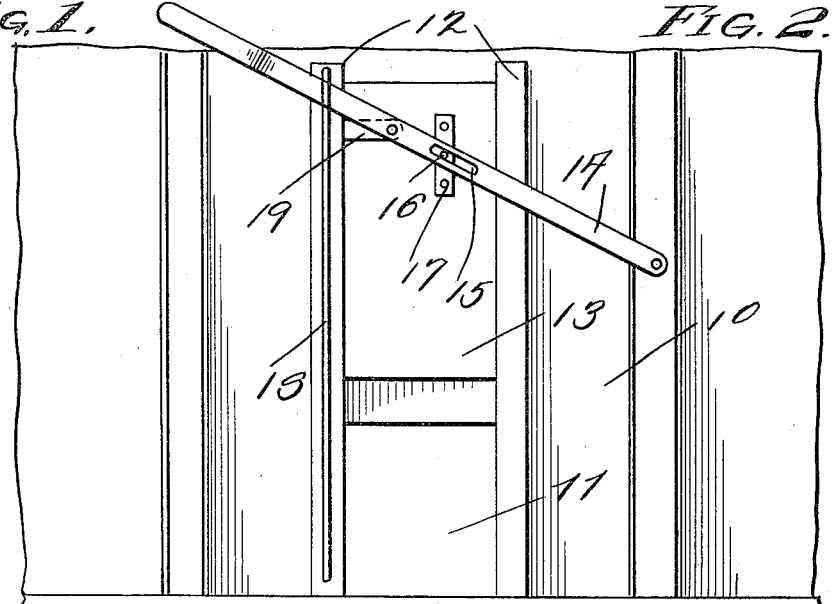
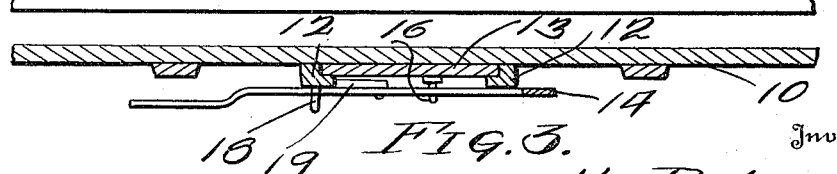
Fig.3.
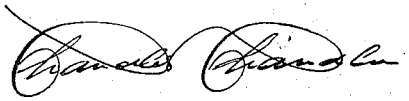

UNITED STATES PATENT OFFICE.

HANS PEDERSON, OF MILTON, NORTH DAKOTA.

END-GATE.

1,150,961.  Specification of Letters Patent.  Patented Aug. 24, 1915.

Application filed September 23, 1914. Serial No. 863,147.

*To all whom it may concern:*

Be it known that I, HANS PEDERSON, a citizen of the United States, residing at Milton, in the county of Cavalier, State of North Dakota, have invented certain new and useful Improvements in End-Gates; and I do hereby declare the following to be a full, clear, and exact description of the invention, such as will enable others skilled in the art to which it appertains to make and use the same.

This invention relates to improvements in end gates for wagons, and particularly to end gates for grain wagons.

The principal object of the invention is to provide a novel means for holding the grain gate in open and closed position.

Another object is to provide such a structure that is simple and cheap and easy of operation.

Other objects and advantages of the invention will be apparent from the following description when taken in connection with the accompanying drawing.

In the drawings: Figure 1 is an elevation of an end gate showing the grain gate in closed position. Fig. 2 is a similar view showing the grain gate in open position. Fig. 3 is a sectional view in the plane of the operating lever with the latter in its horizontal position.

Referring particularly to the accompanying drawings, 10 represents the wagon end gate in the center of which is formed a vertical elongated opening 11, the vertical sides of which are provided with the guides 12 between which slides the grain gate 13. Pivotally attached to one end of the gate 10 is a lever 14 which extends across the gate and is provided with a longitudinal slot 15 through which projects a pin 16 carried by a plate 17 which is secured to the grain gate 13. By means of this pin and slot connection, when the lever 14 is swung upwardly on its pivot, the grain gate 13 will be moved vertically between the guides 12.

A vertical bar 18 is secured to one of the guides 12 and between this bar and the guide the outer end portion of the lever 14 is disposed and guided. Pivotally mounted on the lever 14 at a point adjacent one of the guides 12 is a block 19, the free end of which engages against the said guide as shown in Fig. 1 so that upward movement of the lever 14 is prevented. By swinging the block 19 upwardly, the lever 14 can be swung so as to raise the gate 13. When the gate is in proper elevated position the block 19 is swung in a direction toward the plate 17 and its free end again engaged with the guide 12 and below the lever 14. The action then will be to hold the lever 14 and gate 13 in elevated or open position.

It will thus be seen that I have provided an extremely simple and cheap device by means of which the sliding grain gate can be effectively held against accidental opening when in closed position or from falling into closed position when opened. The device is of such structure that it may be readily applied to the ordinary grain wagon end gate without any modifications to the gate.

What is claimed is:

The combination with an end gate of a wagon having a vertically slidable grain gate, of guides mounted on the end gate between which the grain gate slides, a transversely disposed lever pivotally mounted at one end of the end gate, a pin carried by the grain gate, said lever being provided with an elongated slot receiving said pin slidably therein, and a pivoted member mounted on the lever and arranged for engagement with one of the guides to hold the grain gate in either open or closed position.

In testimony whereof, I affix my signature, in the presence of two witnesses.

HANS PEDERSON.

Witnesses:
MARIE ASLAKSON,
EARL ARMSTRONG.

Copies of this patent may be obtained for five cents each, by addressing the "Commissioner of Patents, Washington, D. C."